INVENTOR
WALLACE A. COBURN
ATTORNEY

INVENTOR
WALLACE A. COBURN
By Otto John Munz
ATTORNEY

FIG. 16

Dec. 6, 1966   W. A. COBURN   3,289,936
HUMIDIFICATION APPARATUS FOR FORCED AIR HEATING SYSTEM
Filed June 28, 1965   8 Sheets-Sheet 7

INVENTOR
WALLACE A. COBURN

United States Patent Office 3,289,936
Patented Dec. 6, 1966

3,289,936
HUMIDIFICATION APPARATUS FOR FORCED
AIR HEATING SYSTEM
Wallace A. Coburn, deceased, late of Brandon, Manitoba,
Canada, by Clare W. Coburn, 19 Creighton Blvd.;
James H. Coburn, 235 18th St.; and Clara M. Coburn,
310 21st St., executors, all of Brandon, Manitoba,
Canada
Filed June 28, 1965, Ser. No. 470,328
10 Claims. (Cl. 236—44)

This application is a continuation-in-part of application Serial No. 150,852, filed October 27, 1961 and priority thereof is claimed for all subject matter common therewith.

The invention relates to a humidifying apparatus, and in particular to an apparatus for controlling the humidification of the atmosphere in buildings, such as houses and the like.

Generally, the humidification of houses heated by forced air is accomplished by evaporating water from an evaporation pad or by injecting water into the hot air plenum or ducts, leaving the furnace. The water injection type of humidifying apparatus usually includes some type of nozzle or spray device for spraying the water into the plenum when the humidity in the house falls below a predetermined value. The humidifier is thus controlled by a humidity sensing device or the like which switches on the humidifier when ever required. However, it has been found that presently available humidification apparatus possess many disadvantages, such as for example, the injection of too much water into the heating system, i.e., the injection of a greater quantity of water than that which will readily evaporate during a heating cycle. The injection of a greater quantity of water than that which will readily evaporate may result in damage to the heat exchangers in a furnace.

The majority of presently available humidification apparatus are intended to maintain the humidity in a house at a predetermined set value, i.e. a comfortable humidity is found and a humidistat control element controlling the humidification apparatus is set to maintain the humidity at that value.

The setting of a humidity sensing device to produce a constant relatively high humidity is often dangerous, particularly, in cold regions of the country, since condensation in the walls and ceilings of a house can and often does, result. Such condensation tends to cause deterioration of the housing materials and can be seen when wet spots appear on a wall or ceiling.

The following is a table of recommended values of indoor relative humidity based on outdoor temperatures. These values of relative humidity are intended to protect a building against the damages of both too high and too low relative humidity; and in particular to prevent condensation of water on the interior of the windows of a building.

TABLE I

| Outdoor Temperature (° F.) | Relative Humidities at 70° F., percent | | | |
|---|---|---|---|---|
| | Single Window | | Double Window | |
| | Wind | No Wind | Wind | No Wind |
| +20 | 24 | 41 | 53 | 61 |
| 0 | 12 | 27 | 41 | 49 |
| −20 | 6 | 17 | 32 | 39 |
| −40 | 2 | 10 | 23 | 31 |

Although 50% to 60% relative humidity is generally desirable for reasons of health and comfort, it will be appreciated that at the temperatures given above a relative humidity of 50% or 60% would be too high for a house employing common structural materials.

Furthermore, some of the presently available humidifiers, controlled by a humidistat, inject water into a heating system by means of a nozzle which sprays the water into a hot air plenum or duct in a fine mist. When the outdoor temperature is cold and the relative humidity within a house is low, the furnace and the humidifier will be in frequent operation. The water used in a humidifier is usually obtained from a conventional water main and contains varying amounts of mineral salts depending on the part of the country and the source of the water. The constant use of a humidifier often results in clogging of the nozzle device used to spray the water into the heating system. Thus there arises the problem of keeping the spray device free of deposits and otherwise in good operating condition. The mineral salts which tend to clog a nozzle device are also plated out on various parts of the furnace, such as the heat exchangers. Often with continuous operation, one section of the furnace becomes wet, such as for example the heat exchangers, and this can result in serious damage to the furnace.

Furthermore, most of the water injected into a hot air stream in the form of a fine spray which instantly evaporates, results in the mineral salts contained in the water being carried into the space being humidified and deposited as a fine dust.

Accordingly, it is an object of the present invention to provide a relatively simple apparatus for maintaining the relative humidity in a house at a reasonable value by the use of a temperature sensing device only or by both temperatures and humidity sensing devices.

Another object of the invention is to provide an apparatus for controlling the relative humidity in a house, in which apparatus relatively hard water can be used without clogging of the apparatus or dangerous furnace flooding.

A further object of the present invention is to provide an apparatus for accurately controlling the humidity of a house over a wide range of outside temperatures.

Another object of the invention is to provide an apparatus for controlling the humidity in a building wherein the plating out of minerals from the water used in humidifying is also controlled.

According to one embodiment, the present invention provides an apparatus for controlling humidification, which apparatus includes a nozzle for injecting water into a hot air system, and control means for controlling the rate of injection; said control means including a liquid flow control valve, an interrupter device for opening and closing said valve at predetermined intervals, and a pressure sensing device determining the minimum water pressure under which the control will operate.

Further objects and advantages of the invention will be readily apparent from the following description, claims and appended drawings wherein:

Figures 1, 14:
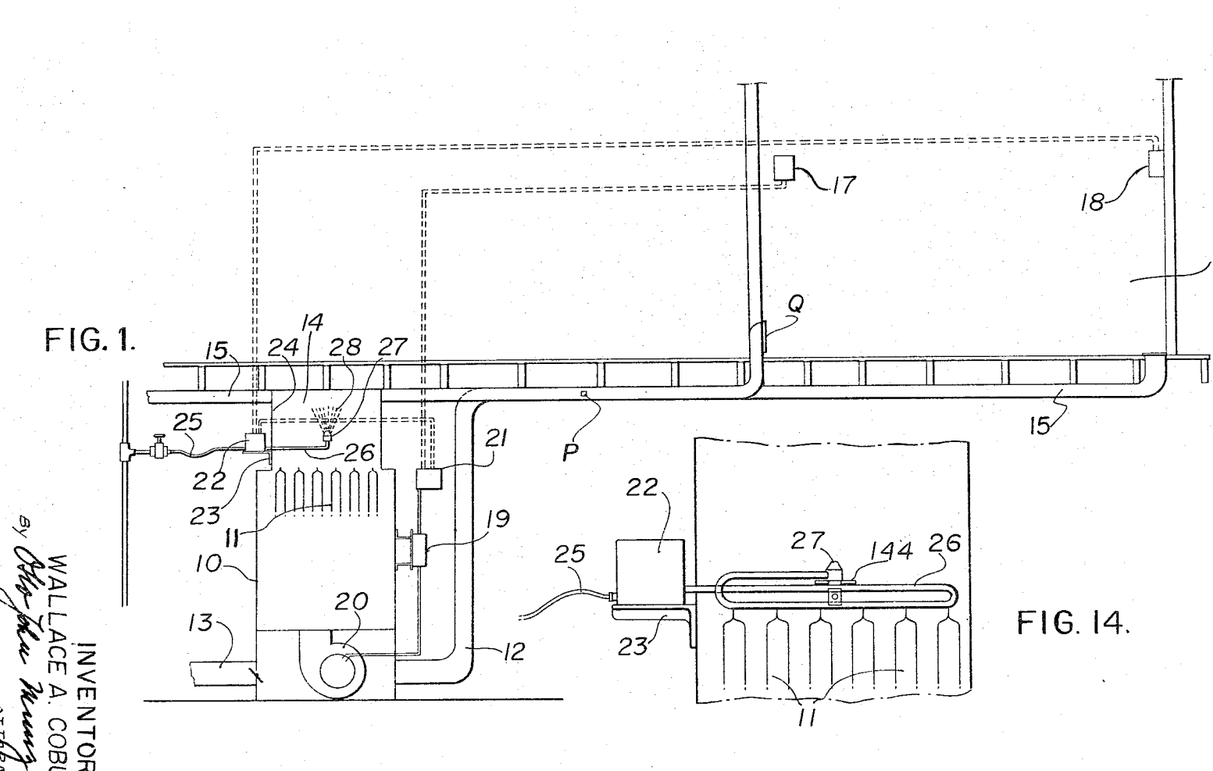
FIGURE 1 is a cross-sectional elevation view of part of a forced warm-air heating installation having a water humidification control apparatus according to the invention installed.
FIGURE 14 shows a pre-heater for elevating the temperature of water prior to atomization.

Referring to the drawings, a conventional forced-air heating installation for a dwelling is shown in partially complete form wherein a furnace 10 having a primary heat exchanger element 11 includes a return air duct 12, a cold air make-up duct 13, a hot air plenum 14, and branching warm-air delivery ducts designated 15. One duct 15 is shown leading to a room 16 wherein a thermostat control element 17 and a humidistat control element 18 are located, respectively connected in circuit relation with a blower control 19 for an air impeller 20 and an injection control 21 for water injection unit 22. The latter is conveniently mounted on a bracket 23 on the plenum wall 24 and is supplied from a suitable source of water under pressure (not shown) by pipe 25.

As will be described more particularly hereinafter, water flows under pressure under control of unit 22 through pipe 26 and is sprayed into the air by atomizing nozzle 27. The nozzle can be located in the free air stream passing upward between heat exchanger elements 11 to discharge a cone-shaped mist or fog 28 upwards, the water particles being carried upward and co-mingling with the warmed air, then passing into respective ducts 15. Under the influence of the warmed air some of the particles evaporate into steam, abstracting heat from the air, and the cooler air, in turn, picks up heat from the duct walls to promote evaporation of the remaining particles prior to the discharge of the air portion into the room 16.

Figure 2:
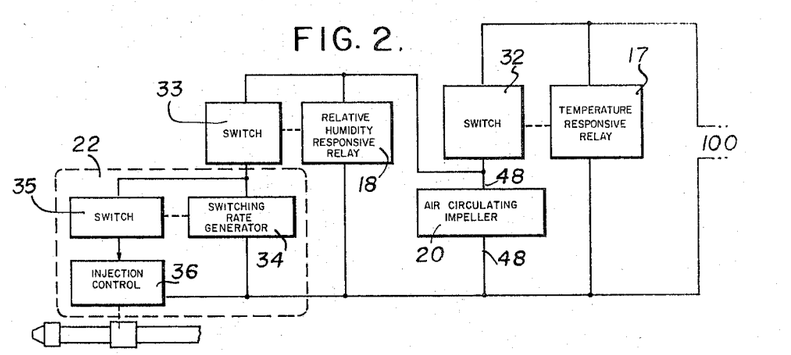
FIGURE 2 is a block diagram of the electrical controls and their inter-relations in the system of FIGURE 1.
Figure 3:
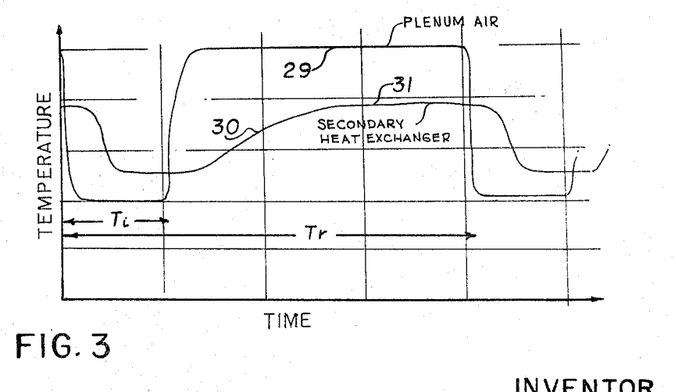
FIGURE 3 graphically diagrams the temperature relations with time for the circulating air portions in the system of FIGURE 1.

Unit 22 regulates the period of water injection, as will be understood from FIGURES 2 and 3, according to a periodic time pattern, and the injection is further restricted to intervals when the humidistat demands injection and also to those times when the thermostat demands circulation of a portion of room air. As graphically depicted by FIGURE 3, the water injection process is cyclic and repetitive, trace 29 showing a pronounced drop of temperature of the treated portion of air in the plenum when injection begins and a rapid rise once injection stops at the end of injection interval ($T_i$). Shortly after injection has commenced, the warm air duct wall temperature, as measured at point marked "P" intermediate the ends of the duct, falls as heat is given up to the relatively cooler air portion flowing therein, and gradually recovers when the steam-air mixture carrying suspended water particles is replaced by following warmer air. The repetition interval ($T_r$) will generally be a multiple of ($T_i$) for example from about 3 to about 20 or more times longer. In any event, the ratio $T_r/T_i$ should be large enough that the plateau portion 31 of trace 30 representing duct temperature as measured near the distance end "Q" of the duct 15 has become substantially horizontal, indicating recovery to normal temperature.

In the functional block diagram of FIGURE 2, the closing of a circuit by temperature sensing device 17 operates switch 32 thereby energizing the impeller 20, and also supplying the humidity sensing element 18. When the latter demands increase of humidity the switch 33 is operated to supply a switching rate generator 34 in control unit 22. The periodic closing of switch 35 provides periodic injection of water as valve device 36 is actuated in response to output of generator 34.

Figure 4:
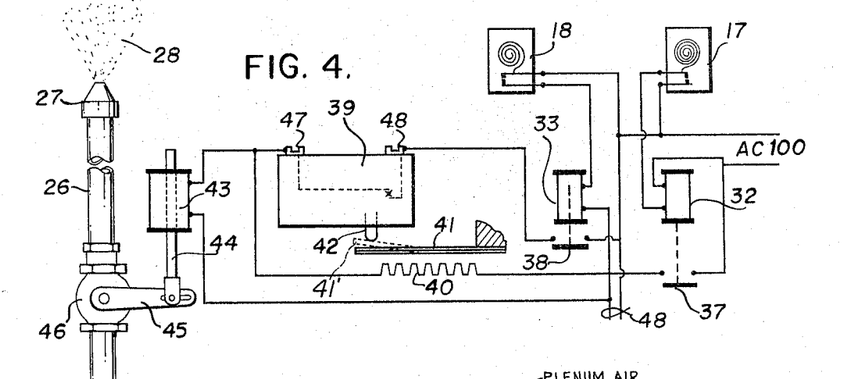
FIGURE 4 is a diagram illustrating one form of mechanism for cyclically injecting water in the system of FIGURE 2.
Figure 5:
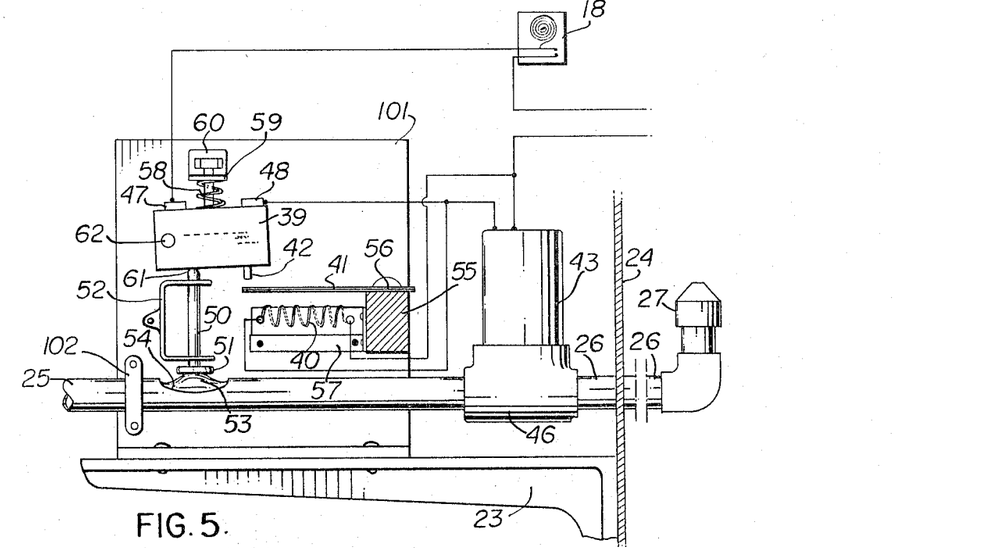
FIGURE 5 is an elevation view of the device of FIGURE 4 further including means to cut off water flow in response to low source pressure.

Turning now to FIGURES 4 and 5, one embodiment of an injection control unit for periodic atomization of water into a warm air plenum space includes a switch element 39 supplied from a source of electric current (not shown) which energizes conductors 100, the current led by way of temperature controlled relay arm 37 and relative humidity controlled relay arm 38, to complete a circuit through solenoid valve 43. Assuming switch 32 operated in response to demand by thermostat 17, arm 37 closes to energize conductors 48 supplying the driving motor therein (not shown) of impeller 20, in a manner well known in the art. If device 18 operates switch 33 to close arm 38 to demand water injection, terminal 48 of miniature snap switch 39 is energized, so that in the normally closed contact state of this switch, current may flow through to terminal 47. Accordingly, solenoid 43 is energized, drawing up plunger 44 and turning arm 45 to open valve 46 leading to pipe 26. Nozzle 27 atomizes the water flowing through it to supply a mist or fog 28 which is discharged in the direction of the air stream in plenum 14.

Resistance heating element 40 is energized at the same time by current, and as the element heats up, the bimetallic strip 41 flexes as its temperature rises from absorption of radiated and convected heat produced by the heating element. The latter may be a wire wound on a ceramic or mica strip, suitably supported as by clips 57, and the bimetallic strip may be anchored by one end in block 55. After a certain time depending on the amount of heat transferred and the nature of the strip, it flexes into the dotted outline curved from 41', and operates plunger 42 to thereby open the circuit normally closed between switch terminals 47 and 48. Thereafter, element 40 cools down gradually and strip 41 loses heat sufficiently to allow switch 39 to regain its closed contact state, the valve 46 meanwhile remaining closed. Depending on the choice of heating rate for element 40 and the dimensions and heat storage capacity of strip 41, the rest interval may be some suitable multiple of the injection interval.

In the embodiment of FIGURE 5, a supply pipe 25, which may be supported by clips 102 on plate 101, has an aperture 54 formed in its wall, exposing a portion of a tubular insert body 53 seated tightly inside the pipe and having its length centered on the aperture length and significantly longer. Tube 53 may be formed of a resilient but dimensionally stable substance, i.e., one which, on being repeatedly deformed within certain limits, regains its rest dimensions. The tube should be of suitable wall thickness such that above a predetermined water pressure, e.g. above 50 p.s.i., the tube wall is deformed outwardly as a bulge extending beyond the cylindrical boundary of pipe 25, has been found to regain its shape repeatedly at lowered pressures. The button head 51 of a pushrod 50 rests upon the exposed wall of tube 53 and presses by its other end 61 against one side of the snap switch 39. An apertured bracket 52 guidedly supports the push rod and is itself secured to support plate 101.

The body of switch 39 is pivoted for limited rotation about a pin 62 also fixed in support plate 101, the pin axis being transverse to the length of rod 50. Under conditions when sufficient operating pressure exists in pipe 25, the switch body is pressed against bias spring 58 and against the end of a limit set screw 60, the latter being adjustably held in bracket 59. In this condition, the end of plunger 42 is clear of the bimetal strip 41 when the latter is cold, i.e., at ambient temperature, and the circuit between switch terminals 47, 48 remains closed, i.e. in normal state. The closing of a circuit through humidity sensing device 18 accordingly energizes both solenoid 43 and heating element 40, as has been described above, to cause injection to commence.

If the hydraulic pressure in tube 53 falls for any reason below a desirable value, as when water is drawn by appliances connected to a common supply line causing a local drop in head, the bulge decreases and allows spring 58 to swing switch body 39 down until plunger 42 is pressed against the strip 41. This force actuates the switch to hold its circuit open between terminals 47, 48, and thereby holds the valve 46 unoperated.

Figures 6, 7:
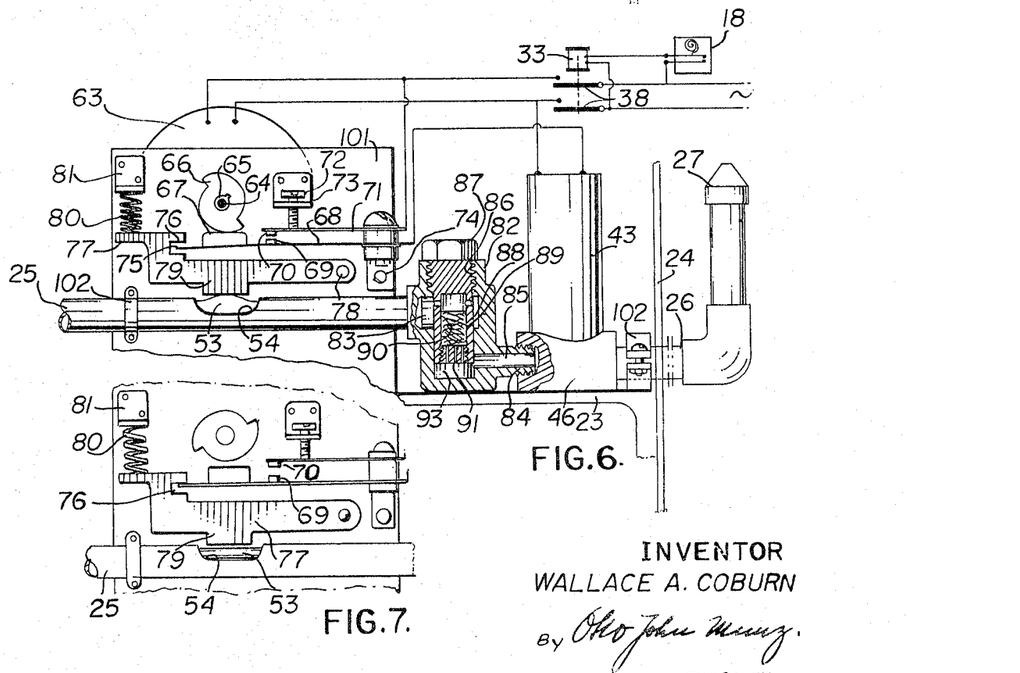
FIGURE 6 is an illustration of mechanism similar to that of FIGURE 5 in its function, including a filter device.
FIGURE 7 shows part of the device of FIGURE 6 as affected by low water pressure.

The periodicity of interrupter devices as described in FIGURES 4 and 5 may be varied within considerable limits, by adjusting set screw 60, and by positioning heater support clip 57 on block 55 further from or closer to strip 41. In most applications a slight irregularity of injection and rest intervals due to varying line voltage and ambient temperature will not be detrimental to satisfactory humidification, as the amount of water injected per hour will ordinarily be adjusted for some excess over requirements, permitting the humidistat to suspend injection from time to time.

Where a very wide range of ratios and durations of injections and rest intervals are desired for an injector control the apparatus of FIGURE 6 may advantageously be employed. An electrically driven clock motor 63 supported on plate 101 has its output shaft 64 coupled to drive cam 65 fast on its shaft at a relatively constant low speed, for example from about one-half to 5 revolutions per minute, when switch arms 38 are closed by operation of relay 33 in response to a low humidity condition sensed by device 18. Cam 65 is suitably formed with two or more lobes 66, which depress wiper block 67 and attached lower conductor strip 68 a corresponding number of times per revolution. When block 67 is depressed sufficiently, a contact 69 carried on the lower strip is separated from a mating contact 70 carried on upper spring conductor strip 71. The maximum depression interval corresponds to the time for the arcuate dwell face of the cam lobe to pass a point on block 67, and the total contact time is determined by the setting of backing screw 72 in bracket 73. The setting regulates the position of contact 70, the injection interval being lengthened as the contact 70 is moved toward the contact 69. During each contact period the solenoid 43 is actuated from supply to open valve 46 and hence to deliver water to nozzle 27.

The projecting end 75 of strip 68 is loosely received in a recess 76 in a pivoting bar 77 which is mounted for limited rotation about pin 78 held in plate 101. A projection 79 extending from a side of the bar rests on a resilient tubular insert 53 as described for FIGURE 5, for sensing hydraulic pressure in pipe 25.

As may be better understood by reference additionally to FIGURE 7, a lowered pressure in pipe 25 allows tube 53 to relax, and bar 77 to swing down under the force of bias spring 80 which has its ends secured respectively between the movable end of the bar and the bracket 81. At a certain lower pressure, strip 68 is prevented from rising up to engage its contact 69 with contact 70 when a lobe 66 has moved beyond wiper block 67. Consequently, the valve 46 is held unoperated, i.e., closed, to prevent flow to the nozzle.

Figures 8, 15:
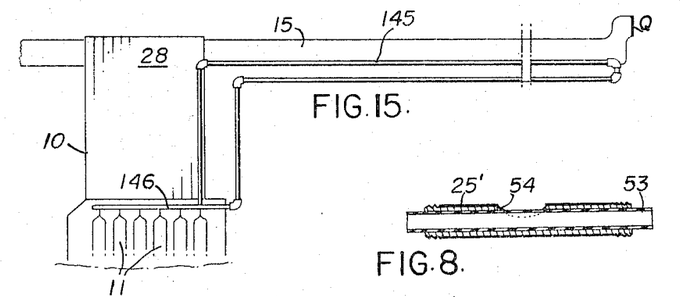
FIGURE 8 is a longitudinal cross-section of a portion of the device of FIGURE 5.
FIGURE 15 illustrates an active secondary heat exchanger element associated with the warm-air ducts.

As shown in FIGURE 8, the pressure sensing device comprises a removable nipple or short tube 25' in whose bore a resilient tube 53 is received, of sufficient length to extend beyond each of the ends of the delivery tube 25'. The dis-assembly from either end of the delivery tube permits the insert to be readily removed for replacement.

One form of screen device suitable for trapping particles whose sizes would be likely to cause clogging of a nozzle orifice comprises a body 82 shown partly cut-away in FIGURE 6, having an inlet pipe-receiving bore 83, a threaded projecting nipple 84 formed with an offset outlet bore 85, and a threaded screen-receiving bore 86, the latter being transverse to and intersecting the other bores. Cap screw 87 has its threaded shank received in the open end of bore 86 and has an axial cylindrical extension 88 formed with an axial open-ended bore 89. A filter screen 90 of suitable type, which may be a folded wire screen, is received in bore 89 and is held captive by perforated plug 91 threadably engaged in the open end of the bore. Water flowing through transverse apertures 83 in body 88 enters bore 89 at its upper end, and passes down through the screen into stepped bore 93, thence through bore 85 to valve 46. Removal of cap screw 87 therefore also withdraws the screen which may be readily removed for cleaning.

Figure 9:
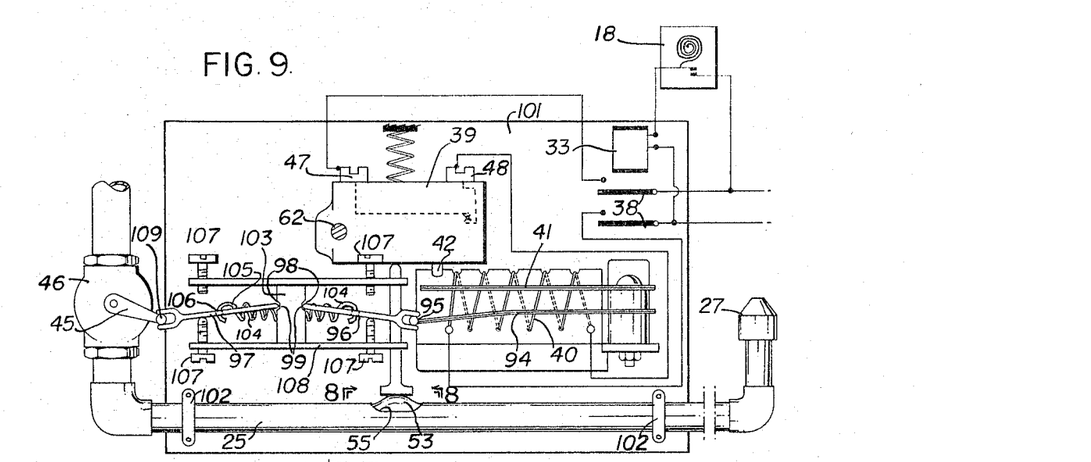
FIGURE 9 is an elevation view of still another form of injection cycling control mechanism.
Figure 10:
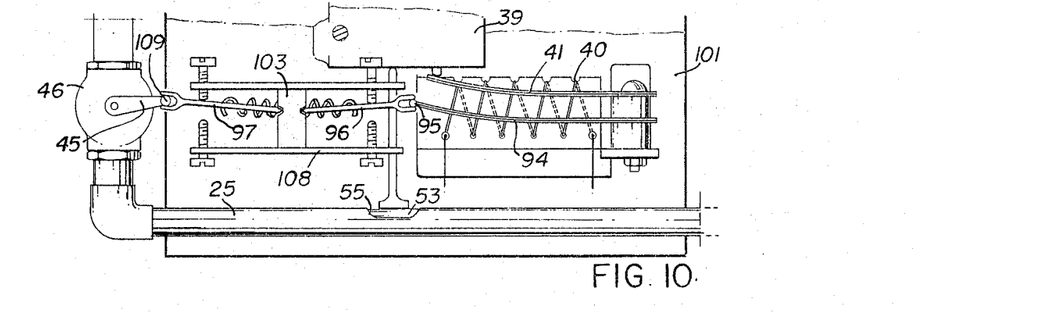
FIGURE 10 is a view of the device of FIGURE 9 showing the alternative valve state.

In the embodiments of FIGURES 9 an 10 a thermal motor 94 of the bimetallic strip type is arranged to be actuated by the same heating element 40 as flexes the bimetal cycle-generating strip 41, to produce a positive snap action of opening and closing of turn valve 46. As described with reference to FIGURE 4 hereinabove, normally closed snap switch 39 has the path between its terminals 47 and 48 periodically opened as the relatively slow acting strip 41 flexes upward to push plunger 42 in. A relatively lighter and faster-acting bimetallic strip 94 is arranged to take up heat from the same element 40, and to bend further and earlier than strip 41. The end 95 of strip 94 is engaged with a yoke-shaped end of one toggle bar 96 of a pair of toggle bars, whereof bar 97 is the companion. Both toggle bars have knife edge ends 98 seated in respective opposed V-grooves 99 formed on opposite sides of fixed block 103. A bias spring 104 has its hook ends 105 engaged under tension in apertures 106. When one of the toggle bars is rotated against the bias spring force through such angle that the couple produced by spring tension reverses its sense, the system "snaps" over to an alternate limit position as determined by the setting of stop screw 107 in fixed frame bars 108. The flexing of strip 94 upward as heat is applied to it, therefore, leads ultimately to the state depicted in FIGURE 10, wherein the outer ends of bars 96, 97 are above the knife edge pivot axes, causing valve arm 45 to be turned into closed position by the yoke-shaped outer end of bar 97 which engages pin 109.

Figure 11:
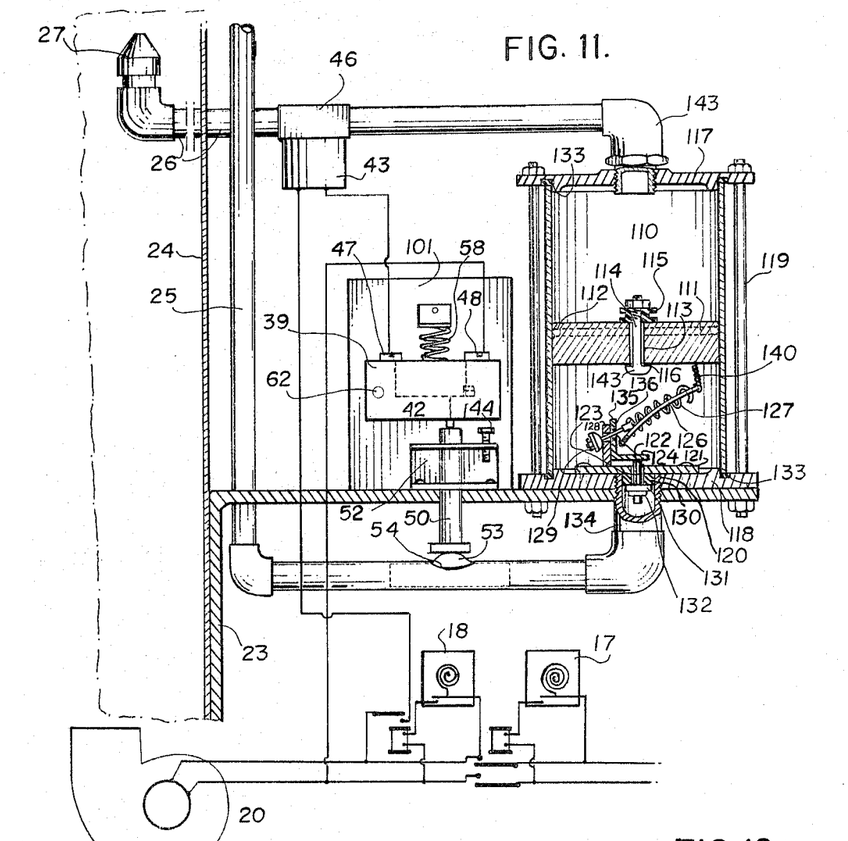
FIGURE 11 is an elevation view in partial cross-section showing a hydraulic metering device for intermittent operation.

In the embodiment of FIGURE 11, the injection control is provided by a hydraulic metering cylinder chamber 110 and associated free piston 111 co-operating with a toggle valve stem 123 and rubber seat 130. The metering device measures a charge to be delivered to the nozzle 27, and determines both the rest interval and injection interval lengths, as will now be more fully described.

The chamber is closed by flanged end discs 117, 118 which carry resilient seal rings 133 on opposed faces, to engage the ends of the cylindrical wall under pressure applied by mounting bolts 119. Disc 118 has a threaded central aperture 120 in which a fitting 134 is received to supply water to the lower space below piston 111 which divides the chamber. Fixed to the inside of disc 118 is a valve seat 121, having a water-tight seal with respect to the lower disc and having a central aperture 122 in which valve stem 123 is loosely received for reciprocatory movement, providing an annular passage around the stem.

The inner end of the stem is fixed to a transverse strip 124 having an out-turned end 135, the latter being pierced by a transverse hole 136. Adjustably held on the lower threaded end of the valve stem is an apertured captive resilient washer 130, retained by washer 131 and nut 132. The strip 124 is guided in a U-shaped frame element 128 fixed on disc 121, and is actuated by the bolt 125 whose shank passes through hole 136. The shank protrudes beyond strip 135 and is received also in adjacent hole 137 formed in the guide bracket, and has a spherical washer 129 fixed on its end. The other end of the shank is fastened to a hook end of bias spring 127 which is disposed in a slot 138 in trip bar 126 and has an end held in aperture 139 of the trip bar. The latter is U-shaped and has its leg portions formed adjacent the opening of the U with bearing shoulders 141 transverse to its length and opposed on opposite sides of slot 138. The shoulders are seated in aligned grooves or seats 142 formed in the guide bracket 128.

Figure 12:
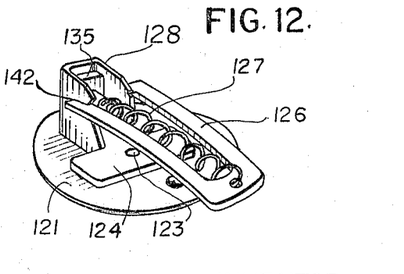
FIGURE 12 shows a perspective detail of the device of FIGURE 11 with the valve control tripped to allow filling.
Figure 13:
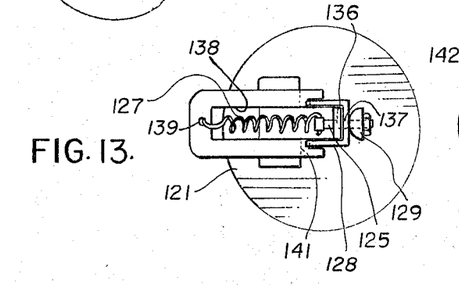
FIGURE 13 is a plan view of the valve of FIGURE 11.

The trip bar has two stable rest positions, in one of which the closed end of the bar is furthest from the valve disc 121 and in the other of which the closed end is relatively near the disc. In the latter position, the strip 135 is depressed, and resilient washer 130 is clear of disc 121, allowing water to flow from pipe 25 when valve 46 is open. As water flows in through annular passage 122, it raises piston 111 which forces a corresponding flow out through discharge fitting 143 to pipe 26. The flow continues until flexible link 140 connected between the trip bar 126 and the lower face of the piston has pulled the trip bar over center. As soon as the bar is tripped, valve disc 130 is pressed against disc 121 to close the annular space 122, which remains closed under hydraulic pressure. No further flow of water passes to nozzle 27.

As soon as the flow is stopped, the weight of piston 111, opposed by the frictional load presented by its O-ring seal 112 and by the hydraulic resistance of restricted flow in the piston passage 113 via slots 116 formed under the head 143 of bleed valve 114, causes the piston to move down and water to flow gradually up into the upper part of the cylinder from the lower part. The rate of flow is regulated in part, by the dimensions of passage 113, and by the compression of soft resilient washer 115 captive on the upper end of bleed valve shank 114 above the passage.

Eventually, the piston forces the trip bar over center to depress valve stem 123, admitting water to commence a new injection cycle.

Solenoid-actuated valve 46 is of the normally closed type, and is held open by energization of its solenoid 43 through switch 39 when the humidistat 18 demands injection. On drop of supply pressure below a critical value, the push rod 50 is lowered as tube 53 relaxes in pipe aperture 54, allowing plunger 42 to move outward and cause a circuit between terminals 47, 48 of switch 39 to open. Adjustment of the cut-off pressure is made by positioning set screw 144 which controls the limit of downward swing of the switch body about pivot pin 62 in plate 101. When the push rod moves free of switch plunger 42, the internal circuit is opened, allowing valve 46 to close.

The evaporation of a mass of water which is relatively large with respect to the mass of the air portion into which it is injected, may be materially aided by raising the temperature of the water, for example to nearly boiling point. For such heavier rates of injection as may be practiced by employing the larger orifice nozzles, the cooling of plenum air during injection may be partly offset by the additional heat provided to the water. In the embodiment of FIGURE 14, the delivery pipe 26 is made considerably longer, and may be convoluted to cross the plenum space transversely one or more times, resting upon the primary heat exchanger element 11. The mass of water contained within the plenum in pipe 26 may be several times the charge injected in an interval, allowing the portion which is atomized to reach a relatively high temperature at the time it leaves the nozzle. In order to prevent dripping due to expansion and contraction of the pipe 26 when device 22 cuts off the flow, a pan 144 may be provided below the nozzle.

In those installations where the temperature of discharge air from ducts 15 is required to be relatively steady throughout the interval when the circulation is maintained, an active form of secondary heat exchanger may be employed in the ducts, such as the device designated 145 in FIGURE 15. The heat exchanger element comprises a liquid-filled line having its horizontal portion carried in duct 15 in the form of a flat or broadened tube, or tube bundle presenting considerable area to the fluent portion. The heat taken up within the furnace by portion 146 is therefore made available to heat the duct walls and the air therein. Where the critical height of the liquid column is adequate, the circulation in element 145 may be produced through gravity forces arising from differences in column heads, or it may be augmented by use of a circulation pump of known type as practiced in heating installations.

It has been found that a humidity sensing device or humidistat 18 is not necessary for the control of humidity within reasonable values such as those given in Table 1.

Figure 16:
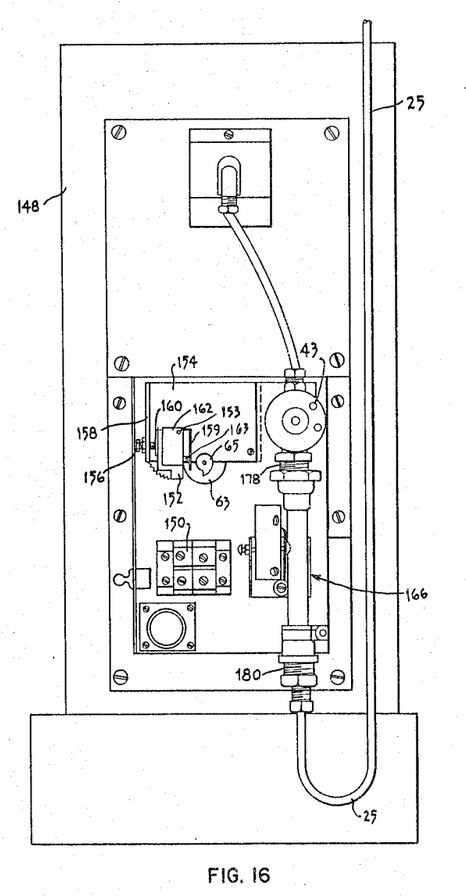
FIGURE 16 is an elevation view of a second form of humidification apparatus constructed in accordance with the present invention.

The use of the apparatus shown in FIGURE 16 of the drawings permits control of humidity within a building through an extended period without necessitating frequent adjustment of the apparatus.

Generally, a house is provided with a furnace which is sized to the house, i.e., the furnace is of sufficient size to heat the house under normal conditions without undue strain on the furnace. It has been found that if a humidification apparatus constructed in accordance with the present invention is sized to a particular furnace during installation the humidity dependent on outside temperature, can be maintained. In this manner wet spots in the walls and ceilings of a house can be eliminated and the problem of plating out of mineral salts solved to the extent that the mineral salts are plated out in the best location.

With reference to FIGURE 16 of the drawings, wherein like numerals indicate like parts, the apparatus for controlling humidity without the use of a relative humidity sensing device includes a mounting plate 148 on which is mounted a nozzle 27, solenoid valve 43, a motor 63, cam 65, switch 162 and a pressure sensing device 166. The mounting plate 148, bearing the above-mentioned integers, is screwed to the wall of a plenum 14 in which a suitable opening has been cut.

The thermostat control element 17, as shown in FIGURE 1, is connected in circuit with the blower control 19 which is connected directly to the humidification apparatus. Thus the injection control 21 is omitted from the embodiment of the invention since the blower and humidification apparatus are energized simultaneously.

Leads from the blower control are connected through terminals 150 to the motor 63, the latter serving to close switch 162 and thus open solenoid valve 43. The switch 162 in combination with motor 63 and cam 65 makes up the interrupter device for periodically opening valve 43 to inject water into the plenum 14 through nozzle 27.

The switch 162 is mounted on a switch mount 152 which is pivotable about pin 153 extending into cover 154 of the motor 63 so that the position of the plunger 163 of the switch can be changed relative to the cam 65 mounted on the drive shaft of the motor 63. A screw 156 extending through a projection 158 on the cover 154 engages a flange 160 on the plate 152 for rotating the latter about the pin. Thus the injection cycle can be changed by bringing the plunger 163 closer to the cam 65, i.e. the cam will hold the switch closed for a length of time dependent upon the distance between the cam 65 and the plunger 163. A flexible metal strip 159, or any other suitable means, secured to one end of the switch body projects between the cam 65 and the plunger 163 to actuate the switch.

When the motor 63 is started by the blower control 19 the cam 65 rotates to force the strip 159 against the plunger 163 thus closing the switch 162 to open solenoid valve 43. When the cam 65 travels past center the switch 162 opens and solenoid valve 43 closes. With the solenoid valve 43 open water is injected into the plenum 14 in a spray which does not immediately evaporate, but is carried by the air stream and strikes the plenum walls and then evaporates before the cam 65 completes its next cycle and opens the valve 43 for another injection. Any mineral salts contained in the water injected into the plenum 14 are thus plated out on the wall of the plenum. The mineral salts plated out on the plenum walls cannot damage the furnace, as would be the case if the water fell on the heat exchangers and then plated out. Futhermore, this type of operation has been found to prevent furnace wetting and the spraying of dust through plenums into the dwelling being heated and humidified.

Water introduced to the valve 43 must pass through pipe 25, connected to a main (not shown), and the pressure sensing device 166. If the water passing through the pressure sensing device 166 is not of sufficiently high pressure to produce a spray from nozzle 27 then the pressure sensing device stops the motor 63 and closes the valve 43 to prevent any further injection until the pressure in pipe 25 rises to a predetermined value.

Figure 18:
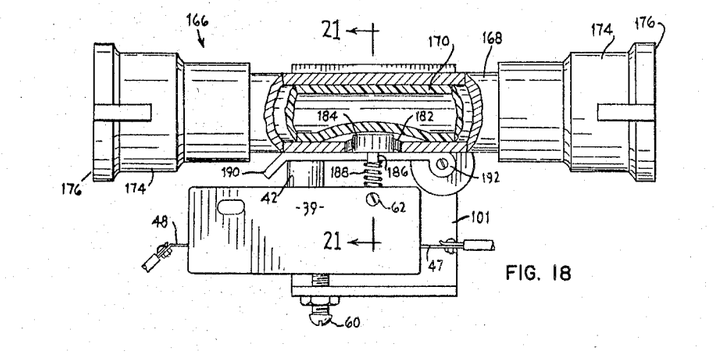
FIGURE 18 is a partially sectioned elevation view of the pressure sensing device employed with the apparatus of FIGURE 16.
Figures 19, 20, 21:
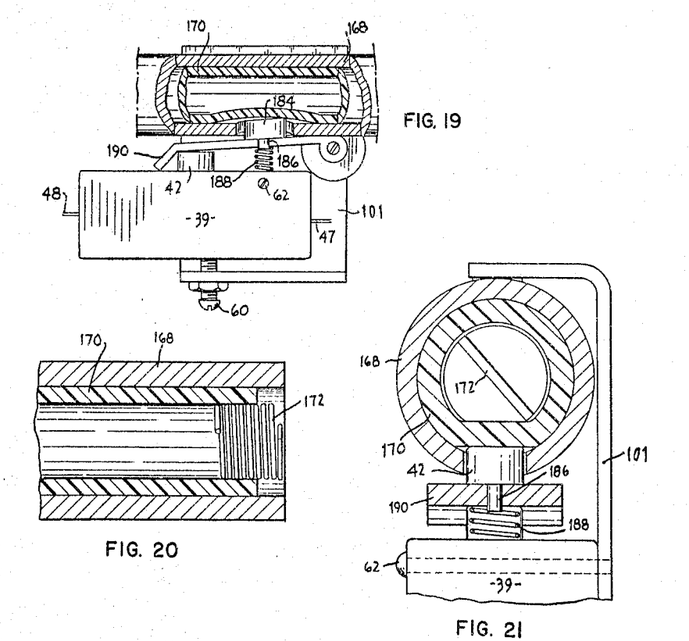
FIGURE 19 is a partly sectioned elevation view of a portion of the device of FIGURE 18.
FIGURE 20 is a cross section of a portion of the device of FIGURE 18.
FIGURE 21 is a cross section taken along line A—A of FIGURE 18.

The pressure sensing device 166, as shown in FIGURE 18 of the drawings, includes a tube 168 of any suitable material, such as copper, having a tube 170 of Jayon, or any other suitable material which tends to return to its original size and shape mounted co-axially therein. The Jayon tube 170 is maintained within the copper tube 168 by means of helical tapering springs 172 screwed into each end of the tube as shown in FIGURES 20 and 21. Copper fittings 174, having internally threaded ends 176, are secured to each end of the copper tube 168 for receiving adaptors 178 and 180 from the valve 43 and the pipe 25, respectively.

Figure 17:
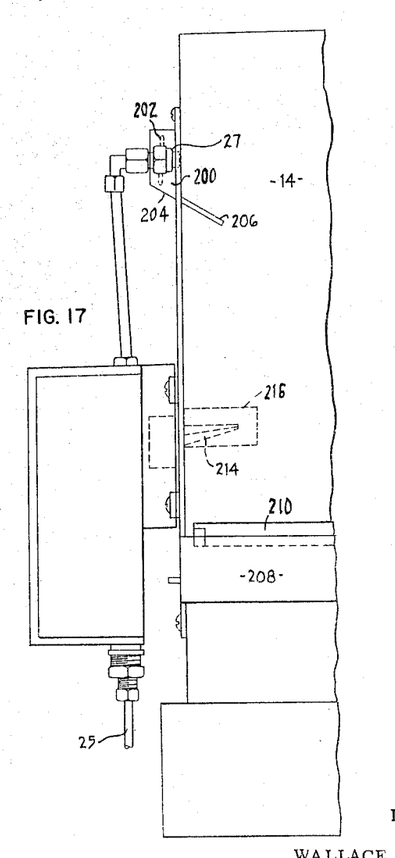
FIGURE 17 is a side view of the apparatus of FIGURE 16 showing a cover over the apparatus.

The pressure sensing device 166 further includes a micro-switch 39 which is operated by changes in pressure in the tube 170. The copper tube 168 is provided with an aperture 182 in one wall thereof exposing a portion of the Jayon tube 170. A disc-shaped button head 184 forming a part of pin 186, rests on the exposed wall of the Jayon tube 170 and is connected by a spring 188 to one side of snap switch 39. The body of the switch 39 is pivoted for limited rotation about a pin 62, the latter also being fixed on support plate 101. The switch 39 can be pivoted about the pin 62 by adjusting the screw 60 to vary the pressure change required to open the switch. A lever 190 pivotable at one end about pin 192 and engageable with plunger 42 is normally parallel to and in abutment with the copper tube 168. The pin 186 extends through an aperture in the lever 190. When there is sufficient water pressure in the tube 170 to ensure the production of the desired spray of water from the nozzle 27, i.e. to ensure that the water sprayed from the nozzle 27 strikes the plenum walls, the lever 190 is pressed against the plunger 42 to keep the switch closed, and to maintain the motor 63 in operation and thus the valve 43 open, if such is the case. If the water pressure in the tube 170 drops below a predetermined level, then the button head 182 is urged against the tube 170, by spring 188, as shown in FIGURE 18, to open the line between terminals 47 and 48 of the switch and thus close the valve 43 and stop the motor 63. Thus, unless the water pressure flowing through the pressure sensing device 166 is high enough to produce the desired spray from nozzle 27, neither the valve 43 nor the motor 63 will operate. The nozzle 27 of this embodiment of the invention, as shown in FIGURE 17 of the drawings, is preferably not in the middle of the plenum to be immediately evaporated while in the hot air stream results in the mineral salts in the water being blown into the house as dust. The nozzle in the side of the plenum wall spray water against the walls of the plenum where the water evaporates and causes plating out of mineral salts on the plenum walls. The position of the nozzle can be changed according to the structure of the heating system in which the apparatus is used. The nozzle 27 should project through a nozzle bracket 200 into a side wall of the plenum. The bracket 200 is provided with louvers 202 for permitting air cooling of the nozzle. This structure ensures that the nozzle 27 does not become heated up sufficiently to cause evaporation of the water contained therein and consequently plating out of mineral salts and clogging of the nozzle is prevented. The size of the nozzle opening should be such that the resulting spray of water is relatively coarse and thus the majority of water injected into the plenum evaporates after it hits the plenum wall. In this manner, the bulk of any mineral salts in the water are plated out on the plenum wall where they do no harm. It will be appreciated that in cases when the water employed in the apparatus contains a relatively large quantity of mineral salts and when the plenum into which the water is injected is relatively large, the mineral salts will not all be plated out in the desired location.

At the end of a normal injection cycle there is a tendency for water remaining in the nozzle 27 to drip from the end of the nozzle and in order to prevent the water from falling onto the furnace heat exchangers, the bottom 204 of the bracket 200 slopes downwardly and a chute 206, an extension of the bottom 204 of the baffle, projects downwardly into the plenum 14. The chute 206 directs any water dripping from the nozzle into a condensate pan 208 secured to the plenum wall below the chute 206.

Figure 22:
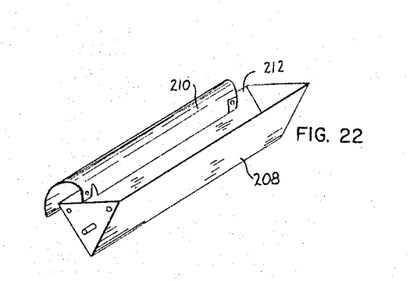
FIGURE 22 is a perspective view of a condensate pan employed with the apparatus of FIGURE 16.

The condensate pan 208, as shown in FIGURE 22 of the drawings, is generally triangular in cross-section, but can be of any desirable configuration. An arcuate deflector plate 210 is secured to one of the side walls 212 of the pan 208 to deflect hot air from the furnace into the pan to evaporate any water collected therein. Thus, under no circumstances, is water permitted to drop into the furnace.

A further feature of the present invention is the provision of a thermostat 214 of any suitable type such as the probe-type thermocouple shown in pecked lines in FIGURE 17 of the drawings, which is wired directly to the terminals 150 in order to shut off the humidifier if the temperature in the plenum 14 is not high enough to evaporate all of the water injected during the period between injections. This feature further ensures that moisture does not collect and run down the walls of the plenum 14 into the furnace. The thermostat 214 is protected from water falling and striking it from above by an arcuate deflector plate 216 which ensures that heat rising in the plenum 14 strikes the thermostat.

In operation, as soon as the thermostat control element 17 calls for heat, the furnace is turned on. When the plenum 14 reaches operating temperature, the blower or fan turns on and, in turn, starts the humidification apparatus. However, the apparatus will not start unless the plenum 14 is at a sufficiently high temperature, the latter being detected by thermostat 214.

In modern dwellings fan controls are generally set low in order to provide continuous or constant air circulation in the dwelling. Furthermore, if the fan controls are faulty the fan will operate even when the furnace is not producing sufficient heat to evaporate all of the water injected into the heating system. Under such circumstances water runs into the furnace and can cause serious damage. The use of the thermostat 214 in the plenum 14 prevents the injection of water into the plenum unless the temperature of the latter is within a predetermined range, the range being such that all of the water injected during one cycle is evaporated before more water is injected during the next cycle.

In order to size the humidification apparatus to a particular furnace, the furnace must be operating. The humidification apparauts is so constructed that the cam 65 can be made to open the switch 162 at intervals which can be varied by adjusting the screw 156. For example, the screw can be adjusted so that the switch 162 is closed for one second and open for nineteen seconds. With this setting very little water will be fed into the plenum 14. Alternatively, the switch 162 can be set to close for two or three, or four, up to ten seconds out of every twenty-second cycle. The cycle can be varied by varying the speed of the motor 63 and by varying the size of the cam 65.

When sizing the apparatus to a given furnace, the switch 162 is at its lowest cycle so that very little water is injected into the plenum 14. Normally all of the water injected will evaporate before the next injection. The screw 156 is adjusted so that the switch 162 remains closed for a longer time and during the injection the plenum walls are felt to determine whether or not a cold spot is developing. If a cold spot is developing, then too much water is being injected into the plenum, i.e., all of the water injected during a cycle is not being evaporated before the next injection, and the injection period should be shortened.

By adjusting the screw 156 the longest injection period for the given furnace can be found and no further adjustment of the humidifier should be required since the apparatus is sized to the furnace. Assuming the furnace is large enough for the given house, then the humidity in the house can be maintained as high as possible without causing damage to the furnace and house.

Under ideal conditions, i.e., when the relative humidity outside of a house is 70 percent and the temperature is as given in Table I, under most conditions the humidity within the house can be maintained, with the use of the apparatus of the present invention, at the values given in Table I. However, under extreme conditions of humidity, the values given in Table I are not usually obtainable with the present apparatus.

It will be appreciated that the humidity sensing device 18 and the injection control means 21, as shown in FIGURE 1, can be included in the apparatus of FIGURE 16 to make the apparatus responsive to the humidity sensing device as well as the temperature sensing device 17 and the blower control.

It will also be appreciated that the quantity of water injected into a heating system can be varied by varying one, or all, of the nozzle size, the injection cycle, the operating pressure of the pressure sensing device, or by raising or lowering the "ON" and "OFF" settings on the thermostat 214.

Thus there has been described a humidification apparatus with which the relative humidity in a dwelling can be controlled during relatively cold weather within ranges depending either on the outside temperature, or on the temperature and humidity within the dwelling.

I claim:

1. An apparatus for controlling the humidification in a forced hot air heating system including a nozzle for injecting water into said system and control means for controlling the rate of injection; said control means including a liquid flow control valve; an interrupter device for opening and closing said valve at predetermined intervals; and a pressure sensing device for interrupting the supply of water to said nozzle when the water pressure falls below a selected minimum value, wherein the nozzle is positioned to spray water against the sides of the ducts of the hot air heating system, and the selected minimum value is the water pressure which will effect contact between the spray and the sides of the ducts.

2. An apparatus for controlling the humidification in a forced air heating system including a nozzle for injecting water into said system, and control means for controlling the rate of injection; said control means including a liquid flow control valve through which water is injected into said nozzle; an interrupter device for opening and closing said valve, said interrupter device being adjustable to permit variation in the rate of operation of said valve; and a pressure sensing device for interrupting the supply of water to said nozzle when the water pressure falls below a selected minimum value, wherein the nozzle is positioned to spray water against the sides of the ducts of the hot air heating system, and the selected minimum value is the water pressure which will effect contact between the spray and the sides of the ducts.

3. An apparatus for controlling the humidification in a forced air heating system including a nozzle for injecting water into said system and control means for controlling the rate of injection; said control means including a solenoid valve through which water is injected into said nozzle; an interrupter device for opening and closing said valve at predetermined intervals, said interrupter device including a motor driven cam and a switch adapted to be periodically closed by said cam to open said valve, the rate of closing of said switch by said cam being adjustable to permit variation in the injection cycle of said valve; and a pressure sensing device for interrupting the supply of water to said nozzle when the water pressure falls below a selected minimum value, wherein the nozzle is positioned to spray water against the sides of the ducts of the hot air heating system, and the selected minimum value is the water pressure which will effect contact between the spray and the sides of the ducts.

4. An apparatus for controlling humidification in a forced air heating system including a nozzle for injecting water into said system and control means for controlling the injection; said control means including a valve through which water is injected into said nozzle; an interrupter device for opening and closing said valve at predetermined intervals; and a pressure sensing device for interrupting the supply of water to said nozzle when the water pressure falls below a selected minimum value, wherein the nozzle is positioned to spray water against the sides of the ducts of the hot air heating system, and the selected minimum value is the water pressure which will effect contact between the spray and the sides of the ducts, said interrupter device including a pivotally mounted switch and a pressure-responsive element determining the opening and closing position of said switch whereby to pivot said switch and open the latter upon a predetermined drop in supply pressure.

5. An apparatus for controlling the humidification in a forced air heating system including a nozzle for injecting water into said system and control means for controlling the rate of injection; said control means including a solenoid valve through which water is supplied to said nozzle; an interrupter device for opening and closing said valve at predetermined intervals, said interrupter device including a motor driven cam and a switch adapted to be periodically closed by said cam to operate said valve, the rate of closing of said switch by said cam being adjustable to permit variations in the injection cycle of said valve; and a pressure sensing device for interrupting the supply of water to said nozzle when the water pressure falls below a selected minimum value, wherein the nozzle is positioned to spray water against the sides of the ducts of the hot air heating system, and the selected minimum value is the water pressure which will effect contact between the spray and the sides of the ducts, said interrupter device including a pivotally mounted switch and a pressure responsive element determining the opening and closing position of said switch whereby to pivot said switch to open the latter upon a predetermined drop in supply pressure.

6. An apparatus for controlling the humidification in a forced air heating system wherein a relative humidity sensing device closes a pair of contacts in response to detection of relative humidity below a predetermined value, said control comprising a source of electrical current, an interrupter device the latter being energized by the closing of said contacts, a liquid flow control valve, means operated by said interrupter to open said valve after a second predetermined delay following the closing of said valve, said interrupter device including a pivotally supported housing, a bias spring urging said housing toward a limit position tending to move said actuation element toward said bimetallic strip and a pressure-responsive element determining the limit position in accordance with supply pressure whereby to rock said housing upon said pivot to open said contacts upon a predetermined drop in supply pressure.

7. An apparatus for controlling the humidification in an air volume for use with heating means wherein heat exchanger means in heat exchange relation with a fluent circulating portion of said air volume raises said portion above room temperature, comprising water injection means for intermittently injecting water into said fluent portion, first control means responsive to said heating means for rendering said injection means operative concurrently with the operation of said heating means, said first control means cyclically and recurrently operating said injection means to inject water into said portion during time-spaced intervals, and a second control means responsive to the pressure in the water supplied to a nozzle, whereby a drop in pressure below a predetermined value is effective, to cut off the supply of water to said nozzle, said second control means comprising a pressure sensing device for interrupting the supply of water to said nozzle when the water pressure falls below said predetermined value, wherein the nozzle is positioned to spray water against the sides of the ducts of a hot air heating system, and the said predetermined value is the water pressure which will effect contact between the spray and the sides of the ducts.

8. An apparatus for controlling the humidification in an air volume, for use with heating means wherein heat exchanger means in heat exchange relation with a fluent circulating portion of said air raises said portion to a temperature above room temperature, comprising water injection means for intermittently injecting water into said fluent portion; first control means responsive to said heating means for rendering said injector means operative concurrently with operation of said heating means; a second control means responsive to the relative humidity of said air volume for holding said injection means inoperative when the relative humidity is greater than a predetermined value; third control means for cyclically and recurrently operating said injector means when permitted by said first and second control means to inject said water during time-spaced injection intervals; and fourth control means responsive to pressure of water supplied to said injector means falling below a predetermined value effective to cut off the supply of water to said injection means, said fourth control means comprising a pressure sensing device for interrupting the supply of water to said injector means, said injector means being positioned for interrupting the supply of water to a nozzle when the water pressure falls below said predetermined value, wherein the nozzle is positioned to spray water against the sides of the ducts of a hot air heating system, and the predetermined value is the water pressure which will effect contact between the spray and the sides of the ducts.

9. An apparatus for controlling the humidification in a forced hot air heating system including a nozzle for injecting water into said system and control means for controlling the rate of injection through said nozzle; said control means including a liquid flow control valve through which water is injected into said nozzle; an interrupter device for opening and closing said valve at predetermined intervals, said interrupter device being actuated concurrently with the actuation of said heating system; a pressure sensing device for interrupting the supply of water to said nozzle when the water pressure falls below a selected minimum value, wherein the nozzle is positioned to spray water against the sides of the ducts of the hot air heating system, and the selected minimum value is the water pressure which will effect contact between the spray and the sides of the ducts; and a heat sensing device for shutting off said apparatus if the temperature in said system is not high enough to evaporate all of the water injected during the interval between injections.

10. An apparatus according to claim 9 wherein said heat sensing device is a probe-type thermostat mounted in said heating system and adapted to open the circuit between the heating system and said interrupter device.

References Cited by the Examiner

UNITED STATES PATENTS

| | | | |
|---|---|---|---|
| 1,809,642 | 6/1931 | Sperry | 200—83.33 |
| 1,989,228 | 1/1935 | Criqui et al. | |
| 2,092,630 | 9/1937 | Bailey. | |
| 2,105,773 | 1/1938 | Magney. | |
| 2,119,605 | 6/1938 | Snediker | 200—140 |
| 2,249,844 | 7/1941 | Martin | 236—68 |
| 2,771,247 | 11/1956 | Williams | 236—44 |
| 2,936,780 | 5/1960 | Pratt | 137—456 X |

FOREIGN PATENTS

| | | |
|---|---|---|
| 141,916 | 7/1951 | Australia. |

ALDEN D. STEWART, *Primary Examiner.*